(12) United States Patent
Kim et al.

(10) Patent No.: US 11,753,004 B2
(45) Date of Patent: Sep. 12, 2023

(54) APPARATUS FOR CONTROLLING AUTONOMOUS DRIVING OF A VEHICLE, SYSTEM HAVING THE SAME AND METHOD THEREOF

(71) Applicants: HYUNDAI MOTOR COMPANY, Seoul (KR); KIA MOTORS CORPORATION, Seoul (KR)

(72) Inventors: Jun Soo Kim, Seoul (KR); Jin Su Jeong, Suwon-si (KR); Jae Yong Jeon, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 193 days.

(21) Appl. No.: 17/073,613

(22) Filed: Oct. 19, 2020

(65) Prior Publication Data
US 2021/0309217 A1 Oct. 7, 2021

(30) Foreign Application Priority Data

Apr. 6, 2020 (KR) .................. 10-2020-0041711

(51) Int. Cl.
*B60W 30/09* (2012.01)
*B60W 30/095* (2012.01)
*B60W 30/18* (2012.01)

(52) U.S. Cl.
CPC ........ *B60W 30/09* (2013.01); *B60W 30/0956* (2013.01); *B60W 30/18163* (2013.01);
(Continued)

(58) Field of Classification Search
CPC ............ B60W 30/09; B60W 30/0956; B60W 30/18163; B60W 2554/4041;
(Continued)

(56) References Cited

U.S. PATENT DOCUMENTS 9,529,361 B2    12/2016  You et al.
2010/0138115 A1* 6/2010  Kageyama .......... B60R 21/0134
                                                              701/45
(Continued)

FOREIGN PATENT DOCUMENTS

CN      106364486 B    8/2019
EP      3375681 A1     9/2018
(Continued)

OTHER PUBLICATIONS

European Search Report dated Apr. 13, 2021 from the corresponding European Application No. 20201740.6, 12 pp.

*Primary Examiner* — Tarek Elarabi
(74) *Attorney, Agent, or Firm* — LEMPIA SUMMERFIELD KATZ LLC (57) ABSTRACT

An apparatus for controlling autonomous driving includes: a processor to determine a travelling situation and a lane position, and determine an autonomous driving control maneuver of a vehicle depending on the determination result, and a non-transitory storage medium to store a result calculated by the processor and a set of instructions executed by the processor. The processor determines a safety of each lane of a road on which the vehicle is travelling to control the vehicle to stop on a lane representing a highest safety, after starting a minimum risk maneuver of the autonomous driving control maneuver.

15 Claims, 4 Drawing Sheets

(52) U.S. Cl.
CPC ............... *B60W 2552/10* (2020.02); *B60W 2554/4041* (2020.02); *B60W 2554/4042* (2020.02)

(58) Field of Classification Search
CPC ..... B60W 2554/4042; B60W 2552/10; B60W 60/007; B60W 60/0053
See application file for complete search history.

(56) References Cited

U.S. PATENT DOCUMENTS

| | | | |
|---|---|---|---|
| 2015/0142244 A1 | 5/2015 | You et al. | |
| 2020/0307582 A1* | 10/2020 | Sato | ....................... B60W 10/04 |
| 2020/0310428 A1* | 10/2020 | Li | ........................... G06N 20/00 |
| 2020/0369281 A1* | 11/2020 | Sato | ................... B60W 30/143 |
| 2021/0294336 A1* | 9/2021 | Maus | ................... G05D 1/0214 |

FOREIGN PATENT DOCUMENTS

| | | | |
|---|---|---|---|
| EP | 3552915 A1 | | 10/2019 |
| JP | H09-132093 A | * | 5/1997 |
| KR | 10-1470190 B1 | | 12/2014 |
| KR | 10-2019-0029192 A | | 3/2019 |
| KR | 10-2019-0068070 A | | 6/2019 |

* cited by examiner

APPARATUS FOR CONTROLLING AUTONOMOUS DRIVING OF A VEHICLE, SYSTEM HAVING THE SAME AND METHOD THEREOF

CROSS-REFERENCE TO RELATED APPLICATION

This application claims priority to and the benefit of Korean Patent Application No. 10-2020-0041711, filed on Apr. 6, 2020, the entire contents of which are incorporated herein by reference.

FIELD

The present disclosure relates to an apparatus for controlling autonomous driving of a vehicle, a system having the same, and a method thereof.

BACKGROUND

The statements in this section merely provide background information related to the present disclosure and may not constitute prior art.

With the development of vehicle industry, an autonomous driving system and a driving assist system partially allowing autonomous driving (hereinafter, autonomous driving and driving assist are collectively referred to as "autonomous driving" for the convenience of explanation) have been developed The autonomous driving system may provide various functions such as maintaining a set speed, maintaining a distance between vehicles, maintaining a lane, and changing of a lane. The autonomous driving system may perform autonomous driving by using various devices such as a sensor to sense an external environment of a vehicle, a sensor to sense information about the vehicle, a global position system (GPS), a detailed map, a system for detecting the state of a user, a steering actuator, an acceleration/deceleration actuator, a communication circuit, and a control circuit (e.g., an electronic control unit (ECU)).

Such an autonomous driving system controls an autonomous driving vehicle through manners, such as a control authority transition to a driver, a minimum risk maneuver, and an emergency maneuver, during the operation depending on a vehicle and a travelling environment. In this case, according to the minimum risk maneuver and the emergency maneuver, the deceleration of the vehicle or the stop control is performed on a lane. However, we have discovered that when a problem situation occurs, since the condition of a road on which a vehicle is travelling is not uniform, when only a function of stopping the vehicle on the lane is supported, a more dangerous situation, such as the collision with the following vehicle, may be caused.

SUMMARY

The present disclosure provides an apparatus for controlling autonomous driving of a vehicle, capable of controlling autonomous driving of a vehicle to perform at least one of a control authority transition to a user, a minimum risk maneuver, or an emergency maneuver depending on a travelling situation and a position of a currently travelling lane of an autonomous driving vehicle, a system having the same, and a method thereof.

According to an aspect of the present disclosure, an apparatus for controlling autonomous driving may include a processor to determine a travelling situation and a lane position and to determine an autonomous driving control maneuver of a vehicle depending on the determination result, and a non-transitory storage medium to store a result calculated by the processor and an algorithm executed by the processor. The processor may include determine a safety of each lane of a road on which the vehicle is travelling to control the vehicle to stop on a lane representing a highest safety, after starting a minimum risk maneuver of the autonomous driving control maneuver.

According to one form, the autonomous driving control maneuver may include at least one of an emergency maneuver, the minimum risk maneuver, or a control authority transition.

According to another form, the processor may calculate a relative distance and a relative speed of an ego vehicle to a moving object or a stationary object with respect to each lane, and calculate a time to collision (TTC) taken to reach at a point in which collision between the ego vehicle and the moving object or the stationary object is expected, based on the relative distance and the relative speed.

In one form, the processor may determine that the safety is high as the TTC is increased.

In some forms of the present disclosure, the processor may apply a weight for a safety to an ego-vehicle lane or a shoulder of at least one lane of the road.

In some forms of the present disclosure, the processor may determine whether the stationary object is present on a shoulder of at least one lane of the road, when a safety of the shoulder is determined as being at a highest level.

In some forms of the present disclosure, the processor may determine whether a space for stopping the vehicle is present on the shoulder and perform stop control in the space, when the space for stopping the vehicle is present on the shoulder.

In some forms of the present disclosure, the processor may perform a control operation to perform the emergency maneuver, when a vehicle suddenly stopped is present in front or when emergency stop is desired due to an accident.

In some forms of the present disclosure, the processor may perform a control operation to perform the emergency stop on a lane on which the vehicle is travelling, when the emergency maneuver is performed.

In some forms of the present disclosure, the processor may perform the minimum risk maneuver, when a driver fails to receive control authority in a state that an autonomous driving control function is difficult to perform.

In some forms of the present disclosure, the processor may determine whether lane change to a lane representing a highest safety is allowed, when the lane representing the highest safety is not an ego-vehicle lane in the minimum risk maneuver.

In some forms of the present disclosure, the processor may perform the lane change to the lane representing the highest safety and perform stop control on the lane representing the highest safety, when the lane change is allowed.

In some forms of the present disclosure, the processor may calculate a danger probability of a relevant lane, an occupy probability of the relevant lane, and a safety probability of the relevant lane depending on specified reference times using the TTC, and determine a safety of the relevant lane using a highest probability of the danger probability, the occupy probability, and the safety probability.

In some forms of the present disclosure, the processor may calculate a longitudinal danger probability for each object and a lane position probability for each object on a relevant lane with respect to each specified reference time, using the TTC, and determine a safety of each lane using the longitudinal danger probability for the object and the lane position probability for the object.

In some forms of the present disclosure, the processor may determine whether the vehicle is completely stopped within a specified time after stop control for the vehicle is completely performed, and request control authority transition to the driver, when the vehicle is not completely stopped.

In some forms of the present disclosure, the processor may determine that a request for control authority transition to a driver is desired, when the vehicle is out of an area designed for an operation of a specified autonomous driving control function.

According to another aspect of the present disclosure, a vehicle system may a sensing device to sense a travelling situation and a lane position during autonomous driving control, and an autonomous driving control apparatus to determine an autonomous driving control maneuver of a vehicle depending on the travelling situation and the lane position. The autonomous driving control apparatus may determine a safety of each lane of a road, on which the vehicle is travelling, to control the vehicle to stop on a lane representing a highest safety, after starting a minimum risk maneuver of the autonomous driving control maneuver.

According to another aspect of the present disclosure, a method for controlling autonomous driving may include determining a travelling situation and a lane position, determining an autonomous driving control maneuver of a vehicle depending on the determination result, determining a safety of each lane of a road, on which the vehicle is travelling, after starting a minimum risk maneuver of the autonomous driving control maneuver, and controlling the vehicle to stop on a lane representing a highest safety In some forms of the present disclosure, the determining of the safety of each lane may include calculating a relative distance and a relative speed of an ego vehicle to a moving object or a stationary object with respect to each lane, and calculating a time to collision (TTC) taken to reach at a point in which collision between the ego vehicle and the moving object or the stationary object is expected, based on the relative distance and the relative speed.

In some forms of the present disclosure, the method may further include calculating a danger probability of a relevant lane, an occupy probability of the relevant lane, and a safety probability of the relevant lane depending on specified reference times using the TTC, and determining a safety of the relevant lane using a highest probability of the danger probability, the occupy probability, and the safety probability.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. Further, in describing the exemplary forms of the present disclosure, a detailed description of well-known features or functions will be ruled out in order not to unnecessarily obscure the gist of the present disclosure.

In the following description of components according to one form of the present disclosure, the terms 'first', 'second', 'B', '(a)', and '(b)' may be used. The terms are used only to distinguish relevant components from other components, and the nature, the order, or the sequence of the relevant components is not limited to the terms. Unless otherwise defined, all terms used herein, including technical or scientific tams, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined in the present application.

The present disclosure discloses a technology of improving vehicle safety by safely controlling a vehicle, depending on a position (lane position) of a lane on which an autonomous driving vehicle is travelling and a traveling situation of the autonomous driving vehicle, on a road including at least one lane, thereby improving the safety of a vehicle.

Hereinafter, exemplary forms of the present disclosure will be described in detail with reference to FIGS. 1 to 4.

Figure 1:
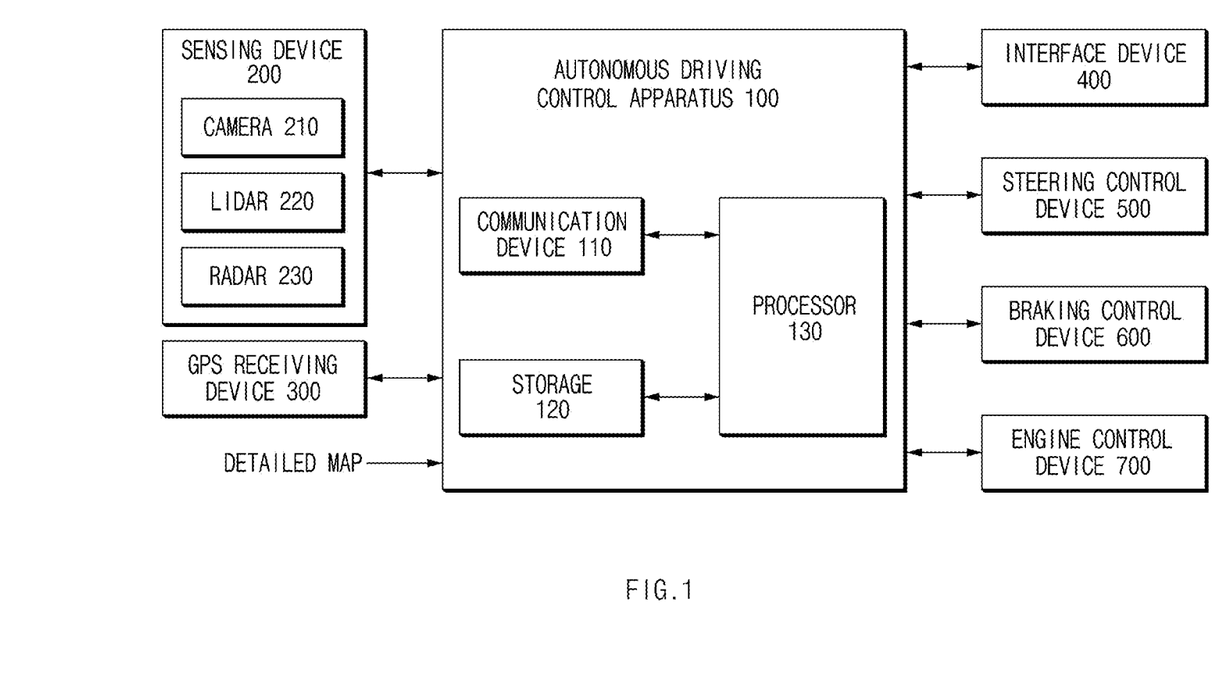
FIG. 1 is a block diagram illustrating a configuration of a vehicle system including an apparatus for controlling autonomous driving, according to one form of the present disclosure.

FIG. 1 is a block diagram illustrating the components of a vehicle system including an apparatus (hereinafter, referred to as "an autonomous driving control apparatus") for controlling the autonomous driving, according to one form of the present disclosure.

Referring to FIG. 1, the autonomous driving control apparatus 100 may be implemented inside the vehicle. In this case, the autonomous driving control apparatus 100 may be formed integrally with the internal control units of the vehicle or may be implemented separately from the internal control units of the vehicle to be connected with the internal control units of the vehicle through a separate connector.

A vehicle system may include an autonomous driving control apparatus 100, a sensing device 200, a global position system (GPS) receiving device 300, an interface device 400, a steering control device 500, a braking control device 600, and an engine control device 700.

The autonomous driving control apparatus 100 may receive information on a lane and an external object from the sensing device 200, may receive information on a vehicle position from the GPS receiving device 300, and may obtain information on a road shape based on a detailed map. In this case, the detailed map may be received from the outside, or a detailed map database inside the vehicle.

The autonomous driving control apparatus 100 may include a communication device 110, a storage 120, and a processor 130.

The communication part 110, which is a hardware device implemented with various electronic circuits to transmit or receive a signal through wireless or wired connection, may make V2I communication through an in-vehicle network communication technology or, wireless Internet access or short range communication technology with an external server of a vehicle, an infrastructure, and other vehicles. In this case, the vehicle network communication technology may include a controller area network (CAN) communication technology, a local interconnect network (LIN) communication technology, a FlexRay communication technology, and in-vehicle communication may be performed through the above communication technology. The wireless Internet technology may include a wireless LAN (WLAN), a wireless broadband (Wibro), a Wi-Fi, World Interoperability for Microwave Access (Wimax). The short range communication technology may include Bluetooth, ZigBee, ultra wideband (UWB), radio frequency identification (RFID), or infrared data association (IrDA).

For example, the communication device 110 may, to the processor 130, data received from the sensing device 200 and the GPS receiving device 200.

The storage 120 may store the sensing result of the sensing device 200 and data or a set of instructions implementing algorithms necessary for the autonomous driving control apparatus 100 to operate.

For example, the storage 120 may sore a calculation result of a danger probability, an occupy probability, a safety probability, and a time to collision (TTC), which are calculated by the processor 130, with respect to each lane. In addition, the storage 120 may store information on an object, which is sensed by the sensing device 200, on each lane, for example, a relative speed or a relative distance to the object. The storage 120 may be implemented with at least one storage medium of a memory in a flash memory type, a hard disk type, a micro type, the type of a card (e.g., a Security Digital (SD) card or an eXtreme digital card), a Random Access Memory (RAM), a Static RAM (SRAM), a Read Only Memory (ROM), a Programmable ROM (PROM), an Electrically Erasable and Programmable ROM (EEPROM), a magnetic RAM (MRAM), a magnetic disk-type memory, or an optical disk-type memory.

The processor 130 may process signals transmitted between the components of the autonomous driving control apparatus 100. The processor 130 may be electrically connected with the communication device 110 and the storage 120, and the like, may electrically control each component, and may be an electric circuit that executes software commands. Accordingly, the processor 130 may perform various data processing and calculation, to be described below. The processor 130 may be, for example, an electronic control unit (ECU), a micro controller unit (MCU), or another lower-level controller mounted in the vehicle.

The processor 130 may determine a travelling situation and a lane position, and may determine an autonomous driving control maneuver of the vehicle, depending on the determination result. In this case, the autonomous driving control maneuver may include a minimum risk maneuver (MRM), an emergency maneuver (EM), and a control authority transition for each lane.

The processor 130 may perform a control operation to perform an emergency maneuver when there is present a vehicle (e.g., a front vehicle) suddenly stopped in front or when emergency stop is desired due to an accident. In this case, the processor 130 may perform a control operation to perform the emergency stop on an ego-vehicle lane on which the vehicle is travelling, without performing lane change when performing the emergency maneuver.

The processor 130 may determine that the request for a control authority transition to a driver is desired, when the vehicle is out of an area designed for an operation of a specified autonomous driving control function.

In addition, the processor 130 requests the control authority transition to the driver, when it is difficult to perform the autonomous driving control function. However, when the driver fails to receive the control authority in the state that it is difficult to perform the autonomous driving control function, the processor 130 may perform the minimum risk maneuver.

The processor 130 may determine the safety of each lane of a road on which the vehicle is travelling and control the vehicle to be stopped on a lane representing the highest safety, after starting the minimum risk maneuver of the autonomous driving control maneuver.

When performing the minimum risk maneuver, the processor 130 may calculate a relative distance and a relative speed of an ego vehicle to a moving object or a stationary object with respect each lane, and may calculate a TTC taken to reach at a point in which the collision between the ego vehicle and the moving object or the stationary object is expected, based on the relative distance and the relative speed. In this case, the TTC may be calculated through following Equation 1.

$$TTC = \frac{s_k^y - s_{ego}}{v_{ego} - v_k^y}$$  Equation 1

In this case, $s_k^y$ denotes a longitudinal distance of a counterpart vehicle having curvilinear coordinates on the curved road and $v_k^y$ denotes the speed of the counterpart vehicle on the curved road. In addition, Sego is a longitudinal distance of the ego vehicle, and Vego is a speed of the ego vehicle. The longitudinal distance and the speed may represent longitudinal motion of the vehicle moving along a lane.

In this case, the processor 130 may determine that the safety is high as the TTC is increased.

The processor 130 may calculate a danger probability of a relevant lane, an occupy probability of the relevant lane, and a safety probability (free probability) of the relevant lane with respect to each specified reference time, using the TTC, and may determine the safety of the relevant lane using the highest probability of the danger probability, the occupy probability, and the safety probability.

In addition, the processor 130 may calculate a longitudinal danger probability for each object and a lane position probability for each object on the relevant lane with respect to each specified reference time using the TTC, and may determine a safety of each lane using the longitudinal danger probability for each object and the lane position probability for each object. The determination of the safety of each lane will be described later in detail with reference to FIG. 3.

When determining the safety of each lane, the processor 130 may assign a weight for safety to the ego-lane or the shoulder of at least one lane of the road, when the safety is determined with respect to each lane. For example, when the ego vehicle is currently travelling on a second lane on a road including a first lane, a second lane, and a third lane, when the safety of the first lane is 50, the safety of the second lane is 60, and the safety of the third lane is 55, and when the weight of the ego vehicle lane is 7 and the weight of the shoulder is 9, the safety of the first lane becomes 50, the safety of the second lane becomes 67, and the safety of the third lane becomes 64, so the stop control on the second lane may be performed.

The processor 130 may determine whether the stationary object is present on the shoulder, when the highest safety is represented on the shoulder of at least one lane of the road.

The processor 130 may determine whether a space for stopping the vehicle is present on the shoulder, and may perform stop control into the space when the space for stopping the vehicle is present on the shoulder.

The processor 130 determines whether lane change is allowed to a lane representing the highest safety when the ego-vehicle lane is not the lane representing the highest safety in the minimum risk maneuver. When the lane change is allowed, the processor 130 may perform the lane change to the lane representing the highest safety and may perform the stop control on the lane representing the highest safety.

The processor 130 may determine whether the vehicle is completely stopped within a specified time after performing the stop control for the vehicle, and may request the control authority transition to the driver, when the vehicle is not completely stopped.

The sensing device 200 may sense surrounding information of the vehicle. For example, the sensing device 200 may sense information (e.g., a position, a speed, and an acceleration) on an external object (e.g., a vehicle, and a pedestrian) positioned in front of, back, or side of the vehicle. In addition, the sensing device 200 may obtain information on a lane (currently travelling lane) on which the vehicle is currently travelling. For example, the sensing device 200 may sense a position of the lane on which the vehicle is currently travelling, a relative speed and a relative distance to an object moving or stationary on the lane, and may recognize the stationary object on the shoulder.

To this end, the sensing device 200 may include a camera 210, a Lidar 220, and a radar 230.

The GPS receiving device 300 receives GSP information from a global position system (GPS) to provide the GPS information to the autonomous driving control apparatus 100.

The interface device 400 may include an input device to receive a control command from a user and an output device to output the operation state and the operation result of the vehicle autonomous driving control apparatus 100. In this case, the input device may include a key button, and may include a mouse, a joystick, a jog shuttle, a stylus pen, or the like. In addition, the input device may include a soft key implemented on a display. The output device may output information on an autonomous driving mode or a notification of a guide for the request for the control authority transition. The output device may include a display. For example, the output device may include a voice output device, such as a display and a speaker, or a vibration motor. In this case, the display may include at least one of a liquid crystal display (LCD), a thin film transistor-liquid crystal display (TFT LCD), an organic light-emitting diode (OLED), a flexible display, a field emission display (FED), and a three dimensional display (3D display). When a touch sensor product, such as a touch film, a touch sheet, a touch pad, or the like, is included in the display, the display may operate as a touch screen, and the input device and the output device may be implemented in the integral form.

The steering control device 500 may be configured to control the steering angle of the vehicle, and may include a steering wheel, an actuator operating together with the steering wheel, and a controller to control the actuator.

The braking control device 600 may be configured to control the braking of the vehicle and may include a controller to control a brake.

The engine control device 700 may be configured to control the engine driving of the vehicle, and may include a controller to control the speed of the vehicle.

As described above, according to the present disclosure, the travelling situation (the vehicle state and the travelling environment) of the autonomous driving vehicle may be determined by utilizing data of the sensing device 200 of the vehicle and the detailed map, topographic information on a lane and a road on which the vehicle is travelling may be obtained by utilizing the detailed map, GPS information, lane information, and data of the sensing device 200, and one of the control authority transition to the driver, the minimum risk maneuver, or the emergency maneuver may be performed using information on the travelling situation of the autonomous driving vehicle and the lane on which the vehicle is current travelling, thereby performing safe autonomous driving control.

Figure 2:
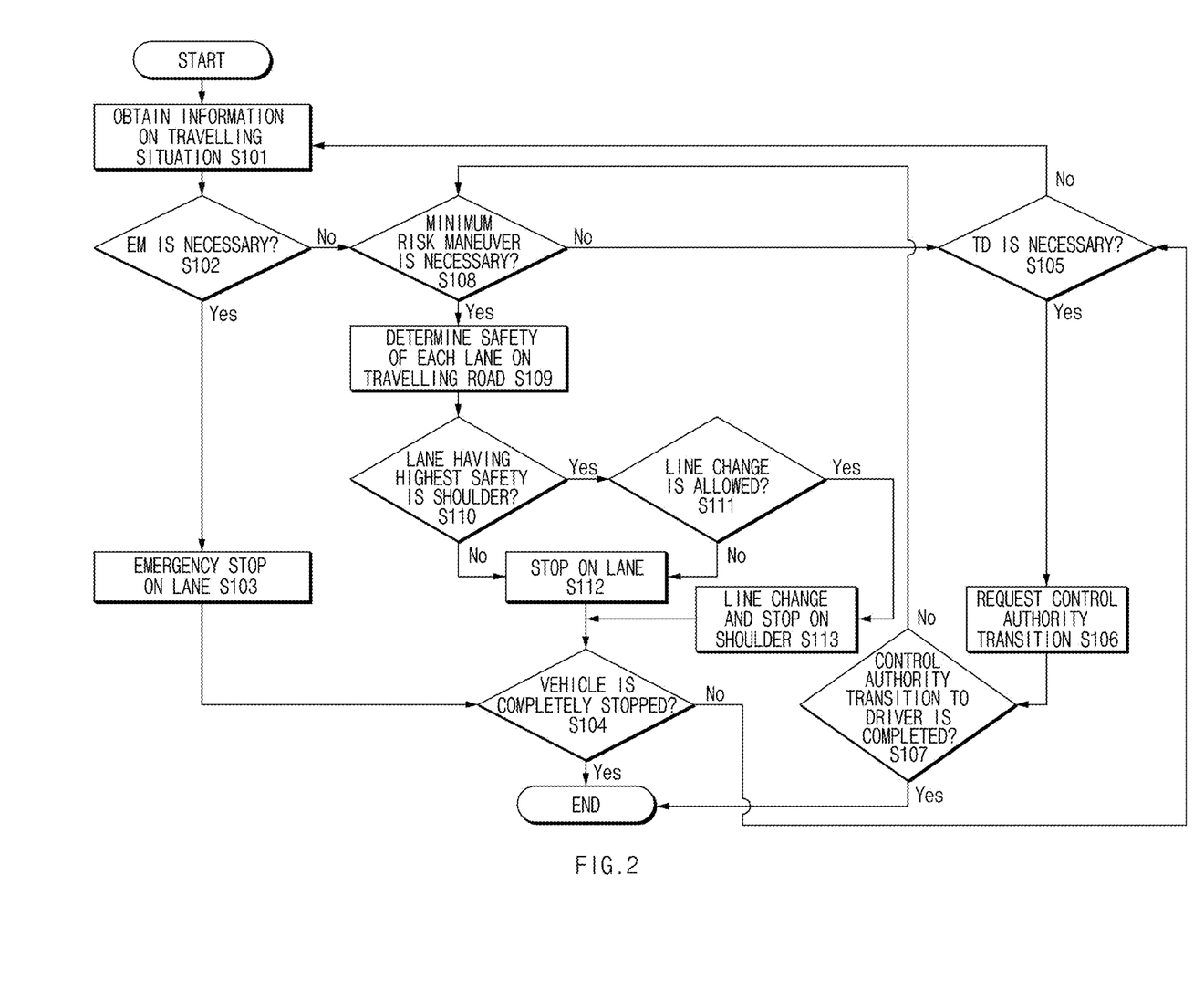
FIG. 2 is a flowchart illustrating a method for controlling autonomous driving, according to another form of the present disclosure.

Hereinafter, a method for controlling autonomous driving of the vehicle in one form of the present disclosure will be described with reference to FIG. 2 in detail. FIG. 2 is a flowchart illustrating the method for controlling autonomous driving.

The following description will be made on the assumption that the autonomous driving control apparatus 100 of FIG. 1 performs a process of FIG. 2. In addition, in the following description made with reference to FIG. 2, it may be understood that operations described as being performed by an apparatus are controlled by the processor 130 of the autonomous driving control apparatus 100.

Referring to FIG. 2, the autonomous driving control apparatus 100 obtains information on a travelling situation (S101). In this case, the autonomous driving control apparatus 100 may determine the travelling situation using data such as sensing information and a detailed map.

In this case, information on the travelling situation may include the state of the autonomous driving vehicle and a travelling environment of a road. The state of the autonomous driving vehicle may include information on the presence of an obstacle in front of the vehicle, a possibility to collide with the obstacle, or the failure of a device, such as the sensing device, associated with an autonomous driving control function. The travelling environment of the road may include the type of a travelling road, for example, information on whether the travelling road is a road, which is an area for an autonomous driving operation, dedicated for the vehicle.

The autonomous driving control apparatus 100 may determine a necessary travelling maneuver based on information on a travelling situation. First, the autonomous driving control apparatus 100 may determine whether a currently travelling situation requires an emergency maneuver (EM) (S102). In other words, the autonomous driving control apparatus 100 may determine that it is desired to perform the EM, when the ego vehicle needs to perform the emergency stop as a vehicle suddenly stopped is present or an unexpected accident occurs in front of the ego vehicle.

The autonomous driving control apparatus 100 performs the emergency stop on the lane, when the emergency maneuver needs to be performed (S103).

Thereafter, the autonomous driving control apparatus 100 determines whether the vehicle is completely stopped (S104). The autonomous driving control apparatus 100 terminates the emergency maneuver when the emergency stop is completely performed, and determines whether the control authority transition is desired when the emergency stop is not completed, that is when the vehicle keeps travelling (S105). In this case, when it is expected to deviate from an area (e.g., a road dedicated for a vehicle) designed for the operation of an autonomous driving control function, the autonomous driving control apparatus 100 may determine that the control authority transition to the driver is desired.

Meanwhile, in S102, when the currently travelling situation does not require the emergency maneuver, the autonomous driving control apparatus 100 may determine whether the currently travelling situation requires the minimum risk maneuver (S108). In this case, the autonomous driving control apparatus 100 may determine that the currently travelling situation requires the minimum risk maneuver when the complete autonomous driving control function is difficult to be completely performed due to the contamination or the failure in a portion of a sensor, and the driver fails to receive the control authority transition.

When the minimum risk maneuver is desired, the autonomous driving control apparatus 100 determines a lane on which the vehicle is currently travelling and determines the safety of each lane on a road (travelling road) on which the vehicle is travelling (S109).

In this case, the autonomous driving control apparatus 100 may determine the lane on which the vehicle is currently travelling, by combining a detailed map, a front camera, or a surround view monitor, and may determine the safety of each lane by combining the detailed map and the information from the camera 210, the Lidar 220, and the radar 230. In detail, the autonomous driving control apparatus 100 calculates a relative distance and a relative speed to a moving object or a stationary object on each lane, and may calculate a time taken until the ego vehicle stops without colliding with the moving object or the stationary object on each lane. In this case, it may be determined that the safety is high as the time is increased until the ego vehicle stops without colliding with the moving object or the stationary object on each lane, a weight may be applied to the ego-vehicle lane or the shoulder, and the minimum risk maneuver may be performed with respect to a lane representing higher safety.

When a variable lane is present, the autonomous driving control apparatus 100 may determine whether the variable lane is available as the shoulder through V2V communication information received from surrounding vehicles.

In addition, the autonomous driving control apparatus 100 may determine a stationary obstacle (e.g., stopped vehicle or guide rail) on the shoulder, and may determine whether there is a space for stopping the ego vehicle, to determine safety.

Accordingly, the autonomous driving control apparatus 100 determines whether the shoulder is a lane having the highest safety (S110), and performs stop control on the lane when the shoulder is not the lane having the highest safety (S112). In this case, the autonomous driving control apparatus 100 may perform the stop control after decelerating when stopping on the lane according to the minimum risk maneuver.

Thereafter, the autonomous driving control apparatus 100 determines whether the vehicle is completely stopped (S104). The autonomous driving control apparatus 100 terminates the emergency maneuver when the stop is completely performed, and determines whether the control authority transition is desired when the stop is not completed, that is when the vehicle keeps travelling (S105).

When the lane having the highest safety is the shoulder in S110, the autonomous driving control apparatus 100 determines whether the lane change to the shoulder is allowed, based on the information on the travelling situation (S111). When the lane change is not allowed, the autonomous driving control apparatus 100 performs the stop control on the lane (S112). When the lane change to the shoulder is allowed, the autonomous driving control apparatus 100 may perform the lane change to the shoulder and perform the stop control on the shoulder (S113). In this case, the autonomous driving control apparatus 100 may perform the stop control in an empty space after performing the lane change using information on a moving object or a stationary object in front or back, when stopping the vehicle after changing the lane to the shoulder.

Thereafter, the autonomous driving control apparatus 100 determines whether the vehicle is completely stopped (S104). When the vehicle is completely stopped, the autonomous driving control apparatus 100 terminates the emergency maneuver. When the vehicle is not completely stopped, that is, when the vehicle keeps travelling, the autonomous driving control apparatus 100 may determine whether the control authority transition is desired and may perform the following procedure (S105, S106, and S107).

Meanwhile, the autonomous driving control apparatus 100 may determine whether the currently travelling situation requires the control authority transition (TD) (S105), when the currently travelling situation does not require the emergency maneuver and the minimum risk maneuver in S102 and S108.

When the control authority transition is required, the autonomous driving control apparatus 100 requests the control authority transition (S106), and determines whether the control authority transition is completed within a specified time (S107).

When the control authority transition is not completed, the autonomous driving control apparatus 100 may determine again whether the minimum risk maneuver is desired (S108). The following procedure may be performed by repeating S109 to S113 as described above.

Figure 3:
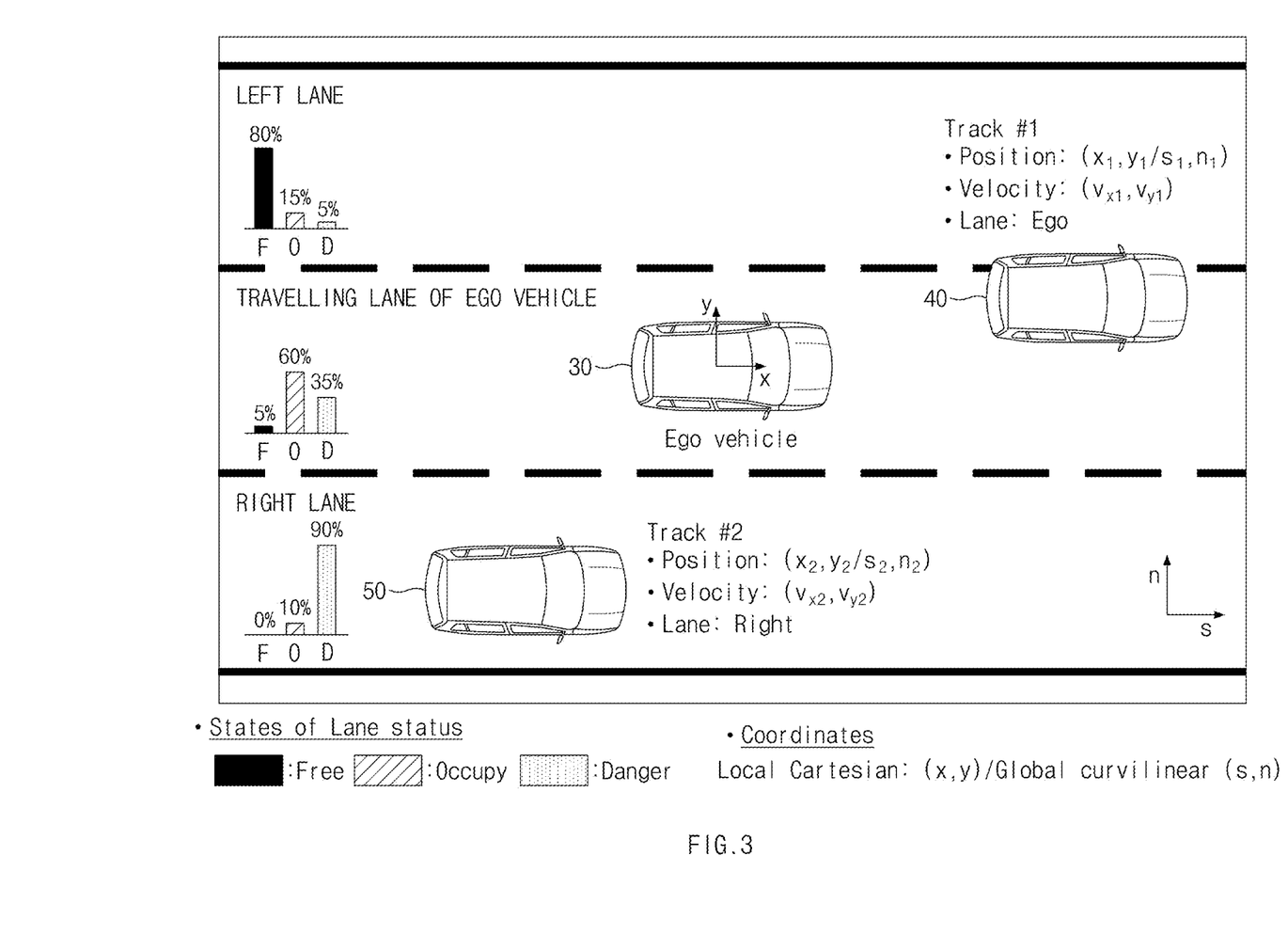
FIG. 3 is a view illustrating a screen to explain a procedure of determining a safety of each lane during autonomous driving, according to other form of the present disclosure.

FIG. 3 is a view illustrating a screen to explain a procedure of determining a safety of each lane during autonomous driving in one form of the present disclosure.

Referring to FIG. 3, the autonomous driving control apparatus 100 may calculate a relative distance and a relative speed of an ego vehicle to a moving object or a stationary object with respect to each lane, and may calculate a TTC taken to reach at a point in which the collision between the ego vehicle and the moving object or the stationary object is expected, thereby determining that the safety is high as the time for stop is increased.

In addition, the autonomous driving control apparatus 100 may determine the safety by applying a weight to the ego-vehicle lane or the shoulder. When there is present a variable lane, the autonomous driving control apparatus 100 may determine whether the variable lane is used as the shoulder, based on information received from the surrounding vehicle through V2X communication and may apply the determination result. In addition, when determining that the stationary object is present on the shoulder based on the sensing information, the autonomous driving control apparatus 100 may determine whether a space for stopping the vehicle is present on the shoulder.

The autonomous driving control apparatus 100 may perform a control operation to perform the minimum risk maneuver by performing lane change to a lane having the highest safety after calculating the safety of each lane.

The autonomous driving control apparatus 100 may calculate a longitudinal risk probability for each object on each lane, to calculate the safety of each lane. In this case, the autonomous driving control apparatus 100 may calculate time to collision (TTC) which is a time taken to reach at the collision point as in Equation 1 to calculate the longitudinal danger probability for each object.

The autonomous driving control apparatus 100 may calculate the TTC which is a time taken to reach at the collision point between the ego vehicle and the moving object or the stationary object on each lane using the relative distance and the relative speed of the ego vehicle to the moving object or the stationary object on each lane.

The 'l', which denotes the dangerous state of the vehicle, may be defined as ([Danger, Occupy, safety]=[D, O, F]) to represent the danger of each lane as a probability.

Accordingly, the autonomous driving control apparatus 100 may calculate a longitudinal danger probability $p(t_{inv,k}^v|l=D)$, a longitudinal occupy probability $P(t_{inv,k}^v|l=O)$, a longitudinal safety probability $p(t_{inv,k}^v|l=F)$ for each lane using the TTC as in following Equation 2.

In other words, following Equation 2 is to calculate the danger probability for the 'l', which denotes the dangerous state of the vehicle, through a likelihood function $(p(t_k^v|l))$ for each of Danger, Occupy, or Safety).

$$p(t_{inv,k}^v|l=D) = \begin{cases} \exp\left(-\frac{(t_{inv,k}^v - \bar{t}_{inv}^{dan})^2}{2\sigma_t^2}\right) & \text{if } t_{inv,k}^v < \bar{t}_{inv}^{dan} \\ 1 & \text{else} \end{cases}$$

$$p(t_{inv,k}^v|l=O) = \begin{cases} \exp\left(-\frac{(t_{inv,k}^v - \bar{t}_{inv}^{occ})^2}{2\sigma_t^2}\right) & \text{if } t_{inv,k}^v < \bar{t}_{inv}^{occ} \\ \exp\left(-\frac{(t_{inv,k}^v - \bar{t}_{inv}^{dan})^2}{2\sigma_t^2}\right) & \text{if } t_{inv,k}^v > \bar{t}_{inv}^{dan} \\ 1 & \text{else} \end{cases}$$

$$p(t_{inv,k}^v|l=F) = \begin{cases} \exp\left(-\frac{(t_{inv,k}^v - \bar{t}_{inv}^{occ})^2}{2\sigma_t^2}\right) & \text{if } t_{inv,k}^v > \bar{t}_{inv}^{occ} \\ 1 & \text{else} \end{cases}$$

Equation 2

In this case, $\sigma_t$ may be obtained from covariance matrices of a track-to-track fusion result. To simplify the likelihood function $p(t_k^v|l)$, an inverse TTC value $t_{inv,k}^v$ is used instead of a TTC value, and a threshold value $\bar{t}_{inv}^{occ}$ of a dangerous state $\bar{t}_{inv}^{dan}$ denotes the threshold value of the occupy state.

For example, reference times (threshold values) of states of [Danger, Occupy, Safety]=[D, O, F] are set to [2 sec, 5 sec, 10 sec], the TTC is calculated from a present relative speed and a present relative distance between the ego vehicle and a counterpart vehicle, and substituted into Equation 2, thereby calculating the probability for each state.

The autonomous driving control apparatus 100 may calculate a lane position probability for each object.

In other words, the autonomous driving control apparatus 100 has to recognize a lane, on which an object (obstacle) is present, to determine a dangerous level for each lane. Accordingly, as in following Equation 3, the autonomous driving control apparatus 100 may perform Normalized lateral position (NLP) for a transverse position 'h' within a lane using side directional data $n_k^v$ on curved-line coordinates associated with a lane position.

$$h_{k^{\nu}}^v = \frac{N_{lane}W_{lane} - 2n_k^v}{2W_{lane}}$$

Equation 3

In this case, $N_{lane}$ represents the number of lanes, $W_{lane}$ represents the width of a lane, and NLP refers to a relative position with respect to the lane. To take into consideration the uncertainty between an object and the lane, the likelihood function for the NLP of lane 'm' may be expressed as in following Equation 4.

$$p(h_k^v|m) = \begin{cases} \exp\left(-\frac{(h_k^v - m)^2}{2w_{lane}\sigma_l^2}\right) & \text{if } h_k^v < m \\ \exp\left(-\frac{(h_k^v - m - 1)^2}{2w_{lane}\sigma_l^2}\right) & \text{if } h_k^v > m + 1 \\ 1 & \text{else} \end{cases}$$

Equation 4

In this case, $\sigma_l$ represents a value that may be derived from a lane confidence probability provided by the camera, and $h_k^v$ represents a normalized transverse position in the lane, and m is the position of the lane. In addition, $p(h_k^v|m)$ represents the probability value for $h_k^v$.

Thereafter, as in following Equation 5, the autonomous driving control apparatus 100 may calculate the safety of each lane by multiplying the longitudinal Danger probability $p(t_{inv,k}^v|l=D)$, the longitudinal Occupy probability $p(t_{inv,k}^v|l=O)$, and the longitudinal safety probability $p(t_{inv,k}^v|l=F)$ for each lane, which are calculated in Equation 2, and the transverse position probability value in the lane, which is calculated in Equation 4.

$$P(L_k^c = D) = 1 - \prod_{v=1}^{v_{max}} [1 - P(l_k^v = D)P(m_k^v = c)],$$

$$P(L_k^c = F) = \prod_{v=1}^{v_{max}} [1 - P(m_k^v = c)[1 - P(l_k^v = F)],$$

$$P(L_k^c = O) = 1 - P(L_k^c = D) - P(L_k^c = F).$$

Equation 5

Accordingly, the autonomous driving control apparatus 100 may determine the safety of the lane based on the highest value of the danger probability $P(L_k^c=D)$, the occupy probability $P(L_k^c=F)$, and the safety probability $P(L_k^c=O)$ of each lane by calculating the safety of the lane in [Danger, Occupy, Safety] as in Equation 5. For example, as illustrated in FIG. 3, when the safety probability among the danger probability, the occupy probability, and the safety probability for the first lane has the highest value, the autonomous driving control apparatus 100 may determine the safety of the first lane as being at the highest level. In addition, when the occupy probability among the danger probability, the occupy probability, and the safety probability for the second lane has the highest value, the autonomous driving control apparatus 100 may determine that the safety of the second lane as being at the intermediate level. In addition, the autonomous driving control device 100 may determine that the safety of the third lane as being at the lowest level when the danger probability among the danger probability, the occupy probability, and the safety probability of the third lane has the highest value.

In addition, the autonomous driving control apparatus 100 may calculate the safety by applying a weight to an ego-vehicle lane and the shoulder.

For example, when the ego vehicle is currently traveling on the second lane of a road including a first lane, a second lane, a third lane, when the safety of the first lane is 65, the safety of the second lane is 60, and the safety of the third lane is 58, and when the weight of 10 is applied to the second lane which is a lane on which the ego vehicle is travelling, the weight of 10 is applied to the third lane which is the shoulder, the safety of the first lane becomes 65, the safety of the second lane becomes 70, and the safety of the third lane becomes 60, the lane representing the highest safety may be determined as the second lane which is the ego-vehicle lane.

As described above, according to the present disclosure, the control operation is performed to determine the travelling maneuver by determining the safety of each travelling lane, so the vehicle becomes more safely out of the dangerous situation. Accordingly, the safety of the autonomous driving control apparatus 100 may be improved.

Figure 4:
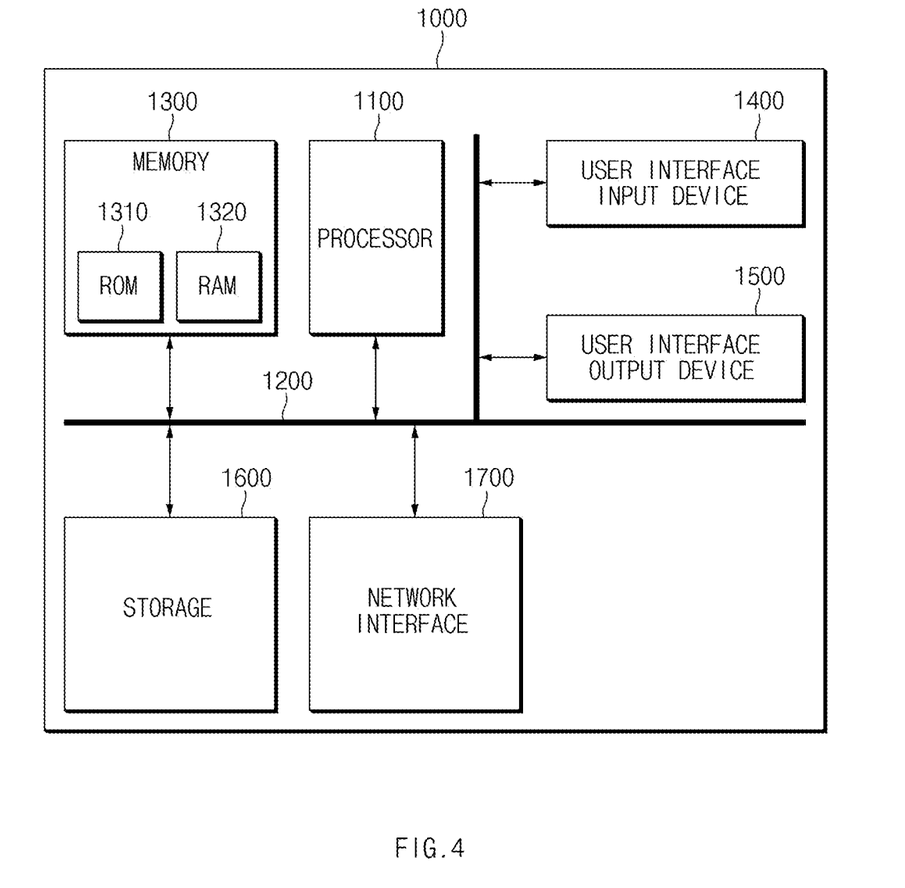
FIG. 4 illustrates a computing system in one form of the present disclosure.

FIG. 4 is a block diagram illustrating a computing device according to one form of the present disclosure.

Referring to FIG. 4, a computing system 1000 may include at least one processor 1100, a memory 1300, a user interface input device 1400, a user interface output device 1500, a storage 1600, and a network interface 1700, which are connected with each other via a system bus 1200.

The processor 1100 may be a central processing unit (CPU) or a semiconductor device for processing instructions stored in the memory 1300 or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the forms disclosed in the present disclosure may be directly implemented with a hardware module, a software module, or the combinations thereof, executed by the processor 1100. The software module may reside on a storage medium (i.e., the memory 1300 or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

According to the present disclosure, the control operation may be performed to perform at least one of the control authority transition to the user, the minimum risk maneuver, or the emergency maneuver depending on the travelling situation and the position of the currently travelling lane of the autonomous driving vehicle.

In particular, according to the present disclosure, when stop control is performed during the autonomous driving, the stop control may be performed on the lane representing the higher safety depending on the travelling situation of the vehicle and the position of the current travelling lane of the vehicle, thereby enhancing the reliability of the autonomous driving function.

Besides, a variety of effects directly or indirectly understood through the present disclosure may be provided.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

Therefore, forms of the present disclosure are not intended to limit the technical spirit of the present disclosure, but provided only for the illustrative purpose.

What is claimed is:

1. An apparatus for controlling autonomous driving, the apparatus comprising:
   a processor configured to determine a travelling situation and a lane position, and determine an autonomous driving control maneuver of a vehicle based on the determined travelling situation and the determined lane position; and
   a non-transitory storage medium configured to store information calculated by the processor and a set of instructions executed by the processor to cause the processor to control the autonomous driving,
   wherein the processor is further configured to:
      control the vehicle by selecting one of an emergency avoidance strategy, a minimum risk maneuver, and a control authority transfer of the vehicle to a driver,
      start a minimum risk maneuver of the autonomous driving control maneuver,
      determine a safety of each lane of a plurality of lanes of a road on which the vehicle is travelling, and
      control the vehicle to stop on a lane which is determined as having a highest safety among the plurality of lanes of the road,
   wherein the autonomous driving control maneuver further includes:
      at least one of an emergency maneuver or the control authority transfer,
   wherein the processor is further configured to:
      when a front vehicle is suddenly stopped or when an accident is present in front of the vehicle, perform the emergency maneuver,
   wherein the processor is further configured to:
      when the emergency maneuver is performed, perform an emergency stop on a lane on which the vehicle is travelling,
   wherein the processor is further configured to:
      when an autonomous driving control function is unable to perform and the control authority transfer of the vehicle to the driver of the vehicle is failed, perform the minimum risk maneuver, and
   wherein the processor is further configured to:
      when the vehicle is out of an area designed for an operation of a specified autonomous driving control function, determine that the control authority transfer of the vehicle to the driver of the vehicle is required.

2. The apparatus of claim 1, wherein the processor is configured to:
   calculate a relative distance and a relative speed of the vehicle to a moving object or a stationary object in the plurality of lanes of the road; and calculate a time to collision (TTC) between the vehicle and the moving object or the stationary object based on the calculated relative distance and the calculated relative speed.

3. The apparatus of claim 2, wherein the processor is configured to:
determine that the safety is higher as the TTC is increased.

4. The apparatus of claim 2, wherein the processor is configured to:
apply a weight for a safety to an ego-vehicle lane in which the vehicle is traveling among the plurality of lanes, or a shoulder of the road.

5. The apparatus of claim 2, wherein the processor is configured to:
when a shoulder of the road is determined as having a highest level of safety compared with safety levels of the plurality of lanes, determine whether the stationary object is present on the shoulder of the road.

6. The apparatus of claim 5, wherein the processor is configured to:
determine whether a space for stopping the vehicle is present on the shoulder, and
when the space for stopping the vehicle is present on the shoulder, perform a stop control to guide and stop the vehicle in the space.

7. The apparatus of claim 2, wherein the processor is configured to:
calculate a danger probability, an occupation probability, and a safety probability of each lane of the plurality of lanes based on specified reference times using the TTC; and
determine the safety of each lane of the plurality of lanes based on the danger probability, the occupation probability, and the safety probability.

8. The apparatus of claim 2, wherein the processor is configured to:
calculate a longitudinal danger probability for each object and a lane position probability for each object on the plurality of lanes based on a specified reference time and the TTC; and
determine the safety of each lane of the plurality of lanes using the longitudinal danger probability for the object and the lane position probability for the object.

9. The apparatus of claim 1, wherein the processor is configured to:
during performing a minimum risk maneuver of the autonomous driving control maneuver, when an ego-lane in which the vehicle is traveling does not have the highest safety, determine whether lane change to a lane having the highest safety is possible.

10. The apparatus of claim 9, wherein the processor is configured to:
when the lane change is possible, perform the lane change to the lane having the highest safety and perform a stop control on the lane having the highest safety.

11. The apparatus of claim 1, wherein the processor is configured to:
determine whether the vehicle is completely stopped within a specified time after completing a stop control for the vehicle; and
when the vehicle is not completely stopped, request the control authority transfer of the vehicle to the driver of the vehicle.

12. A vehicle system comprising:
a sensing device configured to sense a travelling situation and a lane position during an autonomous driving control; and
an autonomous driving control apparatus configured to determine an autonomous driving control maneuver of a vehicle based on the travelling situation and the lane position,
wherein the autonomous driving control apparatus is configured to:
control the vehicle by selecting one of an emergency avoidance strategy, a minimum risk maneuver, and a control authority transfer of the vehicle to a driver,
determine a safety of lanes of a road on which the vehicle is travelling, and
control the vehicle to stop on a lane, among the lanes of the road, representing a highest safety, after starting a minimum risk maneuver of the autonomous driving control maneuver,
wherein the autonomous driving control maneuver further includes:
at least one of an emergency maneuver, or a control authority transition,
wherein the autonomous driving control apparatus is further configured to:
when a front vehicle is suddenly stopped or when an accident is present in front of the vehicle, perform the emergency maneuver,
when the emergency maneuver is performed, perform an emergency stop on a lane on which the vehicle is travelling,
when an autonomous driving control function is unable to perform and transferring a control authority of the vehicle to the driver of the vehicle is failed, perform the minimum risk maneuver, and
when the vehicle is out of an area designed for an operation of a specified autonomous driving control function, determine that the control authority transfer of the vehicle to the driver of the vehicle is required.

13. A method for controlling autonomous driving, the method comprising:
determining, by a processor, a travelling situation and a lane position;
determining, by the processor, an autonomous driving control maneuver of a vehicle based on the determined travelling situation and lane position;
controlling the vehicle by selecting one of an emergency avoidance strategy, a minimum risk maneuver, and a control authority transfer of the vehicle to a driver;
determining, by the processor, a safety of lanes of a road on which the vehicle is travelling, after starting the minimum risk maneuver of the autonomous driving control maneuver; and
controlling, by the processor, the vehicle to stop on a lane, among the lanes of the road, representing a highest safety,
wherein the autonomous driving control maneuver further includes:
at least one of an emergency maneuver, or a control authority transition,
wherein determining the autonomous driving control maneuver includes:
when a front vehicle is suddenly stopped or when an accident is present in front of the vehicle, performing the emergency maneuver,
when the emergency maneuver is performed, performing an emergency stop on a lane on which the vehicle is travelling,
when an autonomous driving control function is unable to perform and transferring a control authority of the vehicle to the driver of the vehicle is failed, performing the minimum risk maneuver, and when the vehicle is out of an area designed for an operation of a specified autonomous driving control function, determining that the control authority transfer of the vehicle to the driver of the vehicle is required.

14. The method of claim 13, wherein determining the safety of the lanes includes:

calculating a relative distance and a relative speed of the vehicle to a moving object or a stationary object in the lane of the road; and calculating a time to collision (TTC) between the vehicle and the moving object or the stationary object based on the calculated relative distance and the calculated relative speed.

15. The method of claim 14, further comprising:

calculating, by the processor, a danger probability, an occupation probability, and a safety probability of the lanes of the road based on specified reference times and the TTC; and determining, by the processor, the safety of the lanes based on the danger probability, the occupation probability, and the safety probability.

* * * * *